Patented Jan. 5, 1943

UNITED STATES PATENT OFFICE 2,307,240

MANUFACTURE OF DIOLEFINS

Robert F. Ruthruff, Chicago, Ill.

No Drawing. Application October 16, 1939,
Serial No. 299,695

6 Claims. (Cl. 260—680)

This invention relates to the production of diolefins from monoolefins. More particularly, this invention relates to the production of conjugated diolefins from monoolefins containing four or five carbon atoms in the molecule.

The dehydrogenation of hydrocarbons to produce other hydrocarbons having a lower hydrogen to carbon ratio than the parent hydrocarbons charged is well known in the art. For example, by simple pyrolysis, ethane is dehydrogenated with the production of ethene and hydrogen. Higher hydrocarbons, such as propane, the butanes and pentanes react similarly on pyrolysis forming respectively propene, butenes and pentenes, together with hydrogen. These pyrolytic dehydrogenation reactions are invariably accompanied by side reactions. For example, in the pyrolysis of propane, in addition to propene and hydrogen, ethene and methane are observed in the products, the latter pair usually being present in the greater amount. Similarly, normal butane on pyrolysis, in addition to giving butene and hydrogen, also yields propene and methane as well as ethene and ethane. In order to repress these pyrolytic decomposition reactions involving the rupture of a carbon to carbon bond and at the same time promote the dehydrogenation reaction, resort is usually had to catalysts. Among suitable catalysts for the purpose may be mentioned alumina and alumina containing minor proportions of an oxide of a sixth group metal such as chromium oxide and molybdenum oxide. When such catalysts, or similar ones, are employed the dehydrogenation reaction proceeds practically to the exclusion of decomposition reactions involving carbon to carbon bond rupture. Selectivities of from 80 to 90% or even more are commonly observed. (Selectivity may be defined as the percentage of the charge reacting that reacts to form an olefin having the same number of carbon atoms as the charge.)

When an attempt is made to catalytically dehydrogenate a hydrocarbon containing six or more carbon atoms, especially a hydrocarbon containing six or more carbons in a straight chain, an entirely new reaction is observed. Only a small amount of olefins is produced, aromatic hydrocarbons being the principal products. Because of the peculiar energy relationships of the benzene ring, the reaction products tend to assume this configuration practically to the exclusion of all other possible products.

While the above discussion has been directed almost exclusively to the behavior of paraffins when subjected to pyrolysis or catalytic dehydrogenation, other hydrocarbons, such as olefins and cycloparaffins behave in an analogous manner on pyrolysis or catalytic dehydrogenation. For example, by the pyrolysis of the normal butenes, more or less butadiene 1, 3 is formed but by far the greater part of the charge reacting gives other products. When however catalysts such as those previously mentioned, or others exhibiting similar properties, are employed, the yield of butadiene 1, 3 is much enhanced. When olefins containing six or more carbon atoms, especially those containing six or more carbon atoms in a straight chain, are dehydrogenated the ring forming reaction is again the principal one observed. Also, if a cycloparaffin, such as cyclohexane, is subjected to catalytic dehydrogenation, benzene is formed almost quantitatively.

As the principal object of this invention is the production of conjugated diolefins from monoolefins it is obvious that the number of suitable charging stocks is considerably circumscribed. Since a conjugated diolefin must contain four or more carbon atoms, suitable monoolefins for the production of these dienes must also contain four or more carbon atoms. Similarly, since monoolefins containing six or more carbon atoms, especially those containing six or more carbon atoms in a straight chain, react almost exclusively to produce aromatics, it is evident that suitable straight chain monoolefins for the purposes of this invention preferably contain five carbon atoms or less. Hence, the preferred charging stocks for the purposes of this invention, are essentially limited to the butenes, especially the normal butenes, and the pentenes, especially the normal pentenes and the methyl butenes. Branched chain monoolefins of six or more carbon atoms, but having no more than five carbon atoms in the longest straight chain can be used in the practice of this invention but even these materials, when subjected to catalytic dehydrogenation, isomerize to a considerable extent with the eventual production of aromatics so the employment of such monoolefins as charging stocks for the instant invention is often not practical. Cycloparaffins, such as cyclobutane, cyclopentane and methyl cyclobutane are identical in composition and functionally similar to the four and five carbon atom monoolefins and can be substituted therefor in the practice of this invention.

In the dehydrogenation of a monoolefin to produce a conjugated diolefin the general reaction may be expressed as follows:

$$C_nH_{2n} = C_nH_{2n-2} + H_2$$

where $n$ is a positive whole number greater than three. The reaction is endothermic. From a consideration of the well known law of mobile equilibrium the conditions theoretically required to insure maximum production of conjugated diolefins can be deduced. Production of conjugated diolefins increases with increasing temperature. Since the reaction proceeds with an increase in volume the reaction will be favored by operating at low pressures. The extent of reaction will increase if one of the products of the reaction is continuously removed from the reaction zone.

The essence of the instant invention is the discovery that more satisfactory results are obtained in the conversion of monoolefins to conjugated diolefins by operating in a manner diametrically opposed to that taught by the law of mobile equilibrium with the exception of the teachings with respect to temperature. Instead of operating at as low a pressure as possible, preferably at subatmospheric pressure, it has been found that more satisfactory results are obtained by operating at atmospheric pressure or preferably at superatmospheric pressure. Instead of removing one of the products of the reaction, it has been found that more satisfactory results are obtained by deliberately adding a large amount of one of the products of the reaction (hydrogen) to the charge. It should be understood that no claim is made that the law of mobile equilibrium does not hold in the present instance. It has been found that the major reaction is accompanied by certain highly unfavorable by-reactions and that these by-reactions are greatly accelerated by operating in accord with the teachings of the law of mobile equilibrium with respect to the major reaction. By operating in a manner diametrically opposed to the teachings of the law of mobile equilibrium the unfavorable by-reactions are largely or completely suppressed and the principal reaction, while somewhat suppressed, proceeds in a highly satisfactory manner.

One object of the instant invention is to provide an improved process for the production of conjugated diolefins by the catalytic dehydrogenation of monoolefins. A further object of this invention is to provide a process for the production of conjugated diolefins by the catalytic dehydrogenation of monoolefins in the presence of added hydrogen. An additional object of this invention is to provide a process for the production of conjugated diolefins by the catalytic dehydrogenation of monoolefins in the presence of added hydrogen and at elevated pressures. Other objects of the instant invention will become evident from a perusal of the instant specification.

In the catalytic dehydrogenation of a monoolefin to form a conjugated diolefin under the conditions prescribed from a consideration of the law of mobile equilibrium a large amount of carbon forms as a by-product. For example, when normal butenes are catalytically dehydrogenated at elevated temperatures and subatmospheric pressure, under the time-temperature conditions necessary to give reasonably high yields of butadiene 1,3, the carbon simultaneously produced amounts to 5 to 30% or more based on the conjugated diolefin formed. This high carbon production obviously represents a direct loss of the charge but it has even more serious consequences. The large amount of carbon formed is deposited on the surfaces of the catalyst thereby rapidly destroying its activity and necessitating frequent regenerations. Actually, when operating at subatmospheric pressures and under the time-temperature conditions necessary for appreciable conversions of monoolefins to diolefins, the activity of the catalyst declines so rapidly that the possible on-stream cycle is so short as to make the process uneconomic. The possible on-stream cycle can be appreciably increased by reducing the severity of the operating conditions, for example by decreasing the contact time or the temperature or both, but when this is done the conversion of the monoolefin to the conjugated diolefin is so low that again the process is uneconomic.

It has now been found that when the monoolefinic charge is diluted with hydrogen and the mixture is passed, preferably at superatmospheric pressure, over a suitable catalyst at elevated temperatures, high conversions to conjugated diolefins are obtained and at the same time the production of carbon is greatly reduced. By operating in the presence of added hydrogen, and preferably under pressure, very satisfactory conversions of monoolefins to conjugated diolefins are obtained and at the same time the deposition of carbon on the catalytic surfaces is so slow that on-stream cycles of economic length are achieved. It is evident that the slow deposition of carbon is equivalent to a low yield of carbon based on the monoolefins charged, a result that is also favorable for the success of the process.

It is believed that when monoolefins are dehydrogenated in the presence of added hydrogen, especially when the reaction is conducted at superatmospheric pressure, the large excess of hydrogen tends to suppress carbon formation by reversing the reaction:

$$C_nH_{2n} = nC + nH_2$$

according to the teachings of the law of mobile equilibrium. Also it is believed that the large excess of hydrogen tends to clean up any carbon that may be deposited in the nascent state on the catalytic surfaces through the mechanism expressed by the type reaction $$C + 2H_2 = CH_4$$

Any carbon that is deposited when operating under the improved conditions is laid down in the nascent state on catalytic surfaces having high hydrogenating-dehydrogenating properties. These surfaces probably hold an adsorbed layer of hydrogen in a highly active state so that the removal of nascent carbon atoms with this adsorbed hydrogen is to be expected. It is to be understood that this explanation of the favorable action of added hydrogen, preferably hydrogen under pressure, is theory only and in no way limits the scope of the instant invention.

For more specific details and examples of the instant invention reference may be made to the following discussion.

As has been mentioned previously, improved results are obtained in the catalytic dehydrogenation of monoolefins to produce conjugated diolefins if the monoolefinic charge is diluted with hydrogen and if the reaction is conducted at atmospheric pressure or preferably superatmospheric pressure. The amount of hydrogen to be added to the monoolefinic charge may be varied over wide limits without departing from the scope or spirit of this invention. However, in order to secure the benefits of this invention to the maximum degree an appreciable amount of hydrogen must be employed. On the other hand, a very large excess of hydrogen is to be avoided for after passing a certain point the addition of more hydrogen results in little or no improvement in the process as a whole or may be actually disadvantageous. In general, from one to ten moles of hydrogen are used per mole of monoolefinic charge. Very satisfactory results follow the use of three moles of hydrogen per mole of monoolefinic charge. Likewise, the operating pressure may be varied over wide limits without departing from the scope and spirit of the present invention vention. Satisfactory results have been obtained when operating in the pressure range atmospheric to 1500 pounds per square inch; pressures of from 200 to 300 pounds per square inch have proved very satisfactory.

In the catalytic dehydrogenation of monoolefins to conjugated diolefins in accord with the teachings of this invention, the variables time and temperature so closely interrelated that it is impossible to consider either of them alone. In general, temperatures of from 550° to 700° C. may be employed, preferably temperatures in the range 600° to 675° C. Contact time may vary from 0.1 to 10 seconds or more, this variable being closely related to temperature. When operating at high temperatures the contact time is preferably short, varying from say 0.1 to 2 seconds or more while at lower temperatures longer contact times are required. It is obvious, that with all other conditions constant, the contact time necessary to obtain a given amount of conversion is also a function of the amount of hydrogen added to the monoolefinic charge.

The catalysts employed form no part of the instant invention; any contact material that behaves in a satisfactory manner may be used. Several satisfactory catalysts have already been mentioned and for convenience means for preparing some of these will be outlined but it is to be understood that these catalysts or these means for the preparation thereof form no part of the present invention.

A chromium oxide on alumina catalyst, suitable for the purposes of the instant invention, may be prepared as follows: Granules of alumina, for example, 8 to 14 mesh activated alumina granules, are immersed in a solution of ammonium dichromate or chromium trioxide. The strength of the solution is so adjusted that the alumina granules, after saturation, contain an amount of solution equivalent to approximately 10% chromium based on the dry alumina. After saturation, the granules are separated from excess solution, are drained and then slowly dried, for example, by spreading in thin layers in air. The dried material is calcined for one hour at a temperataure of 640° C.; the resulting product represents the desired catalyst.

A molybdenum oxide on alumina catalyst may be made similarly, substituting an ammonium molybdate solution for the ammonium dichromate solution (or chromium trioxide solution). In this case, about 5% molybdenum based on the dry alumina is to be absorbed by the alumina.

To further aid in the understanding of the instant invention the following examples are given but it is to be understood that these are illustrative only and in no way limit the scope of the invention.

*Example 1.*—A mixture of one volume mixed normal butenes and three volumes of hydrogen is compressed to a pressure of 300 pounds per square inch and then passed through a heated reactor containing a chromium oxide on alumina catalyst. At a temperature of 675° C. and a contact time of 3 to 4 seconds a high conversion of the normal butenes to butadiene 1,3 was observed and the catalyst showed no appreciable decline in activity during five hours on stream.

*Example 2.*—The gas mixture obtained by the catalytic dehydrogenation of normal butane in the presence of an alumina catalyst and containing 48% normal butane, 22% normal butenes, 24% hydrogen and 6% minor products was compressed to a pressure of 200 pounds per square inch and passed through a reactor containing a chromium oxide on alumina catalyst heated to 650° C. An appreciable part of the butenes present were converted to butadiene 1,3 but catalyst activity declined appreciably over a five hour period. Better results with respect to catalyst life were obtained on repeating the run and charging product from the catalytic dehydrogenation of butane diluted with an equal volume of hydrogen.

*Example 3.*—A mixture of normal pentenes was vaporized and diluted with ten volumes of hydrogen and the resulting material, after compressing to a pressure of 750 pounds per square inch was passed through a reactor filled with molybdenum oxide on alumina catalyst. The reaction temperature was 600° C. A high conversion of the normal pentenes to pentadiene 1,3 was obtained and after five hours on stream the catalyst showed a barely perceptible decline in activity.

*Example 4.*—A mixture consisting of methyl butenes was vaporized and diluted with three volumes of hydrogen and the resulting material was compressed to a pressure of 200 pounds per square inch and passed through a reactor packed with a chromium oxide on alumina catalyst. The catalyst was at a temperature of 625° C. and the contact time was about 2 seconds. A high conversion to isoprene was obtained and the catalyst exhibited no appreciable decline in activity during five hours on stream.

It should be noted that the position of the double bond in the monoolefin charged apparently has no influence on the formula of the diolefin formed. Thus, both butene 1 and butene 2 yield butadiene 1,3. Similarly, both pentene 1 and pentene 2 yield pentadiene, 1,3. Isoprene is obtained on dehydrogenating any of the isomeric methyl butenes. Evidently, during the dehydrogenation of monoolefins having the double bond in the incorrect position for direct formation of conjugated diolefins, isomerization occurs with a shift of the double bond to the proper position. Olefins such as isobutene and dimethyl propene do not give high yields of conjugated diolefins when treated according to the teachings of this invention. It is evident that with these olefins a migration of a methyl group is necessary to give the configuration necessary for forming a conjugated diolefin. Presumably an isomerization of this type is more difficult than one involving the mere shifting of a double bond.

The described process is more than self sustaining with respect to hydrogen. By subjecting the reaction products to known separation processes, for example, fractionation at low temperatures or the well known absorption-fractionation procedure widely practiced in the petroleum industry, the added hydrogen as well as that made in the reaction may, to a large extent, be recovered and the requisite amount recycled to the process.

The conjugated diolefins may also be separated from the products of the reaction by known means and the unreacted monoolefins may be recycled for further processing. For the complete conversion of paraffinic hydrocarbons to conjugated diolefins, the paraffinic hydrocarbons may be catalytically dehydrogenated to form monoolefins, using catalysts such as alumina, chromium oxide on alumina, molybdenum oxide on alumina or similar contacts. The reaction products, after addition of more hydrogen if desired, are preferably raised to superatmospheric pressure and passed to a second dehydrogenation zone for the conversion of monoolefins to diolefins. The products from this second zone are preferably subjected to known separation means so as to eliminate hydrogen, unconverted paraffin plus unconverted monoolefins and conjugated diolefins as separate products. The requisite amount of the hydrogen may be recycled to the second dehydrogenation zone, while the paraffin-monoolefin mixture may be recycled to the first dehydrogenation zone. Or, if desired, the final reaction products may be separated into hydrogen, unconverted paraffins, unconverted monoolefins and conjugated diolefins. The requisite amount of hydrogen and all of the unconverted monoolefins are recycled to the second dehydrogenation zone while unconverted paraffins are recycled to the first dehydrogenation zone.

Another variation consists in separating the reaction products from the first dehydrogenation zone into unconverted paraffins, hydrogen and monoolefins. The unconverted paraffins are recycled to the first dehydrogenation zone while the hydrogen and monoolefins are mixed, additional hydrogen being added if desired, the whole is preferably compressed to superatmospheric pressure, and sent to the second dehydrogenation zone. The reaction products from this second zone may be separated by known means into hydrogen, unconverted olefins and conjugated diolefins. The requisite amount of hydrogen and all of the unconverted monoolefins may then be recycled to the second dehydrogenation zone.

If desired, the dehydrogenation of the paraffins to produce monoolefins may occur in the presence of hydrogen in which case it is preferable to operate under superatmospheric pressure. When the first dehydrogenation zone is operated in this manner certain changes in the separation and recycling of products from both the first and second dehydrogenation zones are usually desirable, but the nature of these changes will be obvious to those skilled in the art and need not be described further.

If desired, the production of conjugated diolefins from paraffins may be accomplished by using but one catalytic dehydrogenation zone. By this procedure, the formation of monoolefins from paraffins and the formation of conjugated diolefins from monoolefins occur in the same catalyst bed. Hydrogen may be added with the paraffinic charge or may be introduced into the catalyst bed at or near the mid point thereof. Or, if desired, the hydrogen obtained in the formation of the monoolefins may alone be used in the second dehydrogenation reaction. The reaction products may be separated into hydrogen, unreacted paraffins, unreacted monoolefins and conjugated diolefins. If desired, a predetermined part of the hydrogen may be recycled to either the entrance of the catalyst bed or to or near the midpoint thereof. The unreacted monoolefins may be handled in a similar fashion while the unreacted paraffins are recycled to the entrance of the single catalyst zone. The single catalyst zone may be operated at atmospheric pressure or preferably at superatmospheric pressure. While this single catalyst bed apparatus is very simple, it is not particularly flexible. As the paraffin to monoolefin reaction and the monoolefin to conjugated diolefin reaction proceed at different rates and are best conducted under different operating conditions, it is evident that a one zone system is not as well suited for the process as the more complicated but more flexible two zone system.

Even when operating in accord with the teachings of this invention the catalysts employed sooner or later decline in activity until the conversion of monoolefins to diolefins falls below economic limits. When this occurs the catalysts may be subjected to a regeneration process. This regeneration may be accomplished, for example, by treating the exhausted catalysts with air or dilute air at elevated temperatures. If desired, two catalyst chambers may be employed, one being used in converting monoolefins to conjugated diolefins while the other is being regenerated, the function of the two chambers being reversed periodically as required.

While the present invention has been described in connection with details and specific examples thereof it is not intended that these shall be regarded as limitations upon the scope of the invention except insofar as included in the following claims.

I claim:

1. In the manufacture of conjugated diolefins from monoolefins, containing more than three carbon atoms to the molecule, the steps comprising adding in the neighborhood of one to ten volumes of hydrogen to said monoolefins and subjecting the resulting mixture to catalytic dehydrogenation at elevated temperatures at a pressure of the order of 200 to 750 pounds per square inch.

2. In the manufacture of conjugated diolefins from monoolefins containing four or five carbon atoms to the molecule, the steps comprising adding in the neighborhood of one to ten volumes of hydrogen to asid monoolefins and subjecting the resulting mixture to catalytic dehydrogenation at elevated temperatures at a pressure of the order of 200 to 750 pounds per square inch.

3. In the manufacture of conjugated diolefins from monoolefins containing four or five carbon atoms to the molecule and having at least four carbon atoms arranged in a straight chain, the steps comprising adding in the neighborhood of one to ten volumes of hydrogen to said monoolefins and subjecting the resulting mixture to catalytic dehydrogenation at elevated temperatures and at a pressure of the order of 200 to 750 pounds per square inch.

4. In the manufacture of butadiene 1,3, the steps comprising adding in the neighborhood of one to ten volumes of hydrogen to a normal butene and subjecting the resulting mixture to catalytic dehydrogenation at elevated temperatures and at a pressure of the order of 200 to 750 pounds per square inch.

5. In the manufacture of pentadiene 1,3, the steps comprising adding in the neighborhood of one to ten volumes of hydrogen to a normal pentene and subjecting the resulting mixture to catalytic dehydrogenation at elevated temperatures and at a pressure of the order of 200 to 750 pounds per square inch.

6. In the manufacture of isoprene, the steps comprising adding in the neighborhood of one to ten volumes of hydrogen to a methyl butene and subjecting the resulting mixture to catalytic dehydrogenation at elevated temperatures and at a pressure of the order of 200 to 750 pounds per square inch.

ROBERT F. RUTHRUFF.